(12) United States Patent
Underhill et al.

(10) Patent No.: US 11,827,113 B2
(45) Date of Patent: Nov. 28, 2023

(54) CHARGE COUPLER SAFETY INTERLOCK SYSTEMS AND METHODS

(71) Applicant: Rivian IP Holdings, LLC, Plymouth, MI (US)

(72) Inventors: Kyle Robert Underhill, Los Angeles, CA (US); Steven Schulz, Torrance, CA (US); Silva Hiti, Redondo Beach, CA (US); Tyler Erikson, Torrance, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 72 days.

(21) Appl. No.: 17/330,630

(22) Filed: May 26, 2021

(65) Prior Publication Data

US 2022/0379749 A1    Dec. 1, 2022

(51) Int. Cl.
*B60L 53/16*    (2019.01)
*B60L 3/04*    (2006.01)

(52) U.S. Cl.
CPC ............ *B60L 53/16* (2019.02); *B60L 3/04* (2013.01); *B60L 2250/10* (2013.01)

(58) Field of Classification Search
CPC .............................. B60L 53/16; B60L 2250/10
USPC ................................................... 320/107
See application file for complete search history.

(56) References Cited

U.S. PATENT DOCUMENTS

| | | | | |
|---|---|---|---|---|
| 7,878,866 | B1* | 2/2011 | Kwasny | H01R 13/633 439/923 |
| 11,322,883 | B1* | 5/2022 | Potterf | H01R 13/7036 |
| 2009/0058295 | A1* | 3/2009 | Auday | H01J 61/305 313/581 |
| 2011/0074351 | A1* | 3/2011 | Bianco | B60L 53/31 320/109 |
| 2012/0003861 | A1* | 1/2012 | Kwasny | B60L 53/18 439/474 |
| 2012/0286729 | A1* | 11/2012 | Yegin | B60L 3/0069 320/109 |
| 2019/0318845 | A1* | 10/2019 | Wang | H01R 13/465 |
| 2021/0237607 | A1* | 8/2021 | Chen | B60L 53/14 |
| 2021/0385095 | A1* | 12/2021 | Raaijmakers | H04L 12/10 |
| 2022/0111747 | A1* | 4/2022 | Goei | B60L 53/66 |
| 2022/0176840 | A1* | 6/2022 | Harris | B60L 53/67 |

\* cited by examiner

*Primary Examiner* — Suchin Parihar
(74) *Attorney, Agent, or Firm* — Clements Bernard Walker; Christopher L. Bernard

(57) ABSTRACT

A charge coupler adapted to be coupled to a charging inlet of an electric vehicle, the charge coupler including: a housing including a first portion adapted to be disposed around a first plurality of contacts and a second portion adapted to be disposed around a second plurality of contacts; a conductive member disposed between the first portion of the housing and the second portion of the housing; and a control system coupled to the conductive member and operable for sensing a break in the conductive member indicating damage to one or more of the first portion of the housing and the second portion of the housing or that the second portion of the housing is detached from the first portion of the housing. Optionally, the conductive member includes a conductive loop disposed around an inner periphery of the housing, the first plurality of contacts, and the second plurality of contacts.

20 Claims, 7 Drawing Sheets

CHARGE COUPLER SAFETY INTERLOCK SYSTEMS AND METHODS

INTRODUCTION

The present disclosure relates generally to the automotive, manufacturing, industrial, and electric equipment fields. More particularly, the present disclosure relates to charge coupler safety interlock systems and methods associated with charging an electric vehicle (EV) or other electric equipment.

Broken combined charging system (CCS) cables and charge couplers account for the majority of field service visits and replacement costs associated with the public charging infrastructure. These CCS cables and charge couplers are used to couple an EV to a charging station, for example; the charge coupler engaging an associated charging inlet of the EV. In this context, it is not uncommon for a vehicle operator to drop, run over, or otherwise damage such CCS cables and charge couplers. One illustrative occurrence is when the electrical contacts of the charge coupler become detached from the remainder of the housing of the charge coupler. With the associated contacts or wires exposed, this poses an operability problem and a safety hazard. Other damage may occur as well. In general, broken components are time consuming and expensive to service.

The present background is provided as illustrative context only and it will be readily apparent to those of ordinary skill in the art that the principles of the present disclosure may be applied in other contexts as well.

SUMMARY

The present disclosure provides an improved charge coupler that is adapted to be coupled to a charging inlet of an EV or other electric equipment. The charge coupler includes a housing that includes, by way of example only, a first, top portion that houses a first plurality of contacts, such as control, AC level 1 and 2, and DC contacts, and a second, bottom portion that houses a second plurality of contacts, such as DC contacts. A conductive member is provided between the first, top portion of the housing and the second, bottom portion of the housing. A control system is coupled to the conductive member operates to sense a break in the conductive member indicating damage to one or more of the first, top portion of the housing and the second, bottom portion of the housing or that the second, bottom portion of the housing is detached from the first, top portion of the housing. The conductive member may include a conductive loop disposed around an inner periphery of the housing, the first plurality of contacts, and the second plurality of contacts, thereby providing a safety interlock. The control system is disposed within the housing itself or a charging station coupled to the charge coupler and provides this safety interlock functionality; disabling current flows and/or raising appropriate alarms when housing integrity is compromised. The charge coupler also includes an accelerometer, gyroscope, orientation sensor, and/or other sensor(s) disposed within the housing, also connected to the control system, operable for sensing an impact to the charge coupler, which again may result in appropriate current interruption and/or alarming. Through the control system, remote monitoring for broken charge couplers is thereby enabled, promoting vehicle and equipment operator safety and public charging infrastructure efficiency.

In one illustrative embodiment, the present disclosure provides a charge coupler, including: a housing including a first portion disposed around a first plurality of contacts and a second portion disposed around a second plurality of contacts; and a conductive member coupling the first portion of the housing and the second portion of the housing. The conductive member may include a plurality of conductive members coupling the first portion of the housing and the second portion of the housing. The conductive member may include a conductive loop disposed around a periphery of the housing. The conductive loop is disposed around the first plurality of contacts and the second plurality of contacts. The charge coupler also includes a control system coupled to the conductive member and configured to detect a conductive break in the conductive member indicating one or more of: (1) damage to one or more of the first portion of the housing and the second portion of the housing and (2) that the second portion of the housing is detached from the first portion of the housing. The charge coupler is adapted to a charging station, and the control system is coupled to the conductive member via one or more of: (1) a wire in a cable connecting the housing to the charging station and (2) a wireless link. The control system is configured to stop a current flow to one or more of the first plurality of contacts and the second plurality of contacts responsive to detecting the conductive break in the conductive member. The control system is also configured to issue an alert to a user responsive to detecting the conductive break in the conductive member. The charge coupler further includes a sensor coupled to the housing and configured to sense an impact to the charge coupler. The control system is coupled to the sensor and configured to detect the sensed impact to the charge coupler. The charge coupler is again adapted to the charging station, and the control system is coupled to the sensor via one or more of: (1) a wire in a cable connecting the housing to the charging station and (2) a wireless link. The control system is configured to stop a current flow to one or more of the first plurality of contacts and the second plurality of contacts responsive to detecting the sensed impact to the charge coupler. The control system is also configured to issue an alert to a user responsive to detecting the sensed impact to the charge coupler.

In another illustrative embodiment, the present disclosure provides a method, including: detecting a conductive break in a conductive member coupling a first portion of a housing of a charge coupler disposed around a first plurality of contacts and a second portion of the housing of the charge coupler disposed around a second plurality of contacts, thereby indicating one or more of: (1) damage to one or more of the first portion of the housing and the second portion of the housing and (2) that the second portion of the housing is detached from the first portion of the housing. The method also includes stopping a current flow to one or more of the first plurality of contacts and the second plurality of contacts responsive to detecting the conductive break in the conductive member. The method further includes issuing an alert to a user responsive to detecting the conductive break in the conductive member. The method further includes sensing an impact to the charge coupler using a sensor coupled to the housing. The method further includes stopping a current flow to one or more of the first plurality of contacts and the second plurality of contacts responsive to detecting the sensed impact to the charge coupler. The method further includes issuing an alert to a user responsive to detecting the sensed impact to the charge coupler.

In a further illustrative embodiment, the present disclosure provides a charging system for an electric vehicle, the charging system including a charge coupler. The charge coupler includes a housing including a first portion disposed around a first plurality of contacts and a second portion disposed around a second plurality of contacts; and a conductive member coupling the first portion of the housing and the second portion of the housing. The charging system also includes a control system coupled to the conductive member and configured to detect a conductive break in the conductive member indicating one or more of: (1) damage to one or more of the first portion of the housing and the second portion of the housing and (2) that the second portion of the housing is detached from the first portion of the housing.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

The present disclosure provides an improved charge coupler that is adapted to be coupled to a charging inlet of an EV or other electric equipment. The charge coupler includes a housing that includes, by way of example only, a first, top portion that houses a first plurality of contacts, such as control, AC level 1 and 2, and DC contacts, and a second, bottom portion that houses a second plurality of contacts, such as DC contacts. A conductive member is provided between the first, top portion of the housing and the second, bottom portion of the housing. A control system is coupled to the conductive member operates to sense a break in the conductive member indicating damage to one or more of the first, top portion of the housing and the second, bottom portion of the housing or that the second, bottom portion of the housing is detached from the first, top portion of the housing. The conductive member may include a conductive loop disposed around an inner periphery of the housing, the first plurality of contacts, and the second plurality of contacts, thereby providing a safety interlock. The control system is disposed within the housing itself or a charging station coupled to the charge coupler and provides this safety interlock functionality; disabling current flows and/or raising appropriate alarms when housing integrity is compromised. The charge coupler also includes an accelerometer, gyroscope, orientation sensor, and/or other sensor(s) disposed within the housing, also connected to the control system, operable for sensing an impact to the charge coupler, which again may result in appropriate current interruption and/or alarming. Through the control system, remote monitoring for broken charge couplers is thereby enabled, promoting vehicle and equipment operator safety and public charging infrastructure efficiency.

Figure 1:
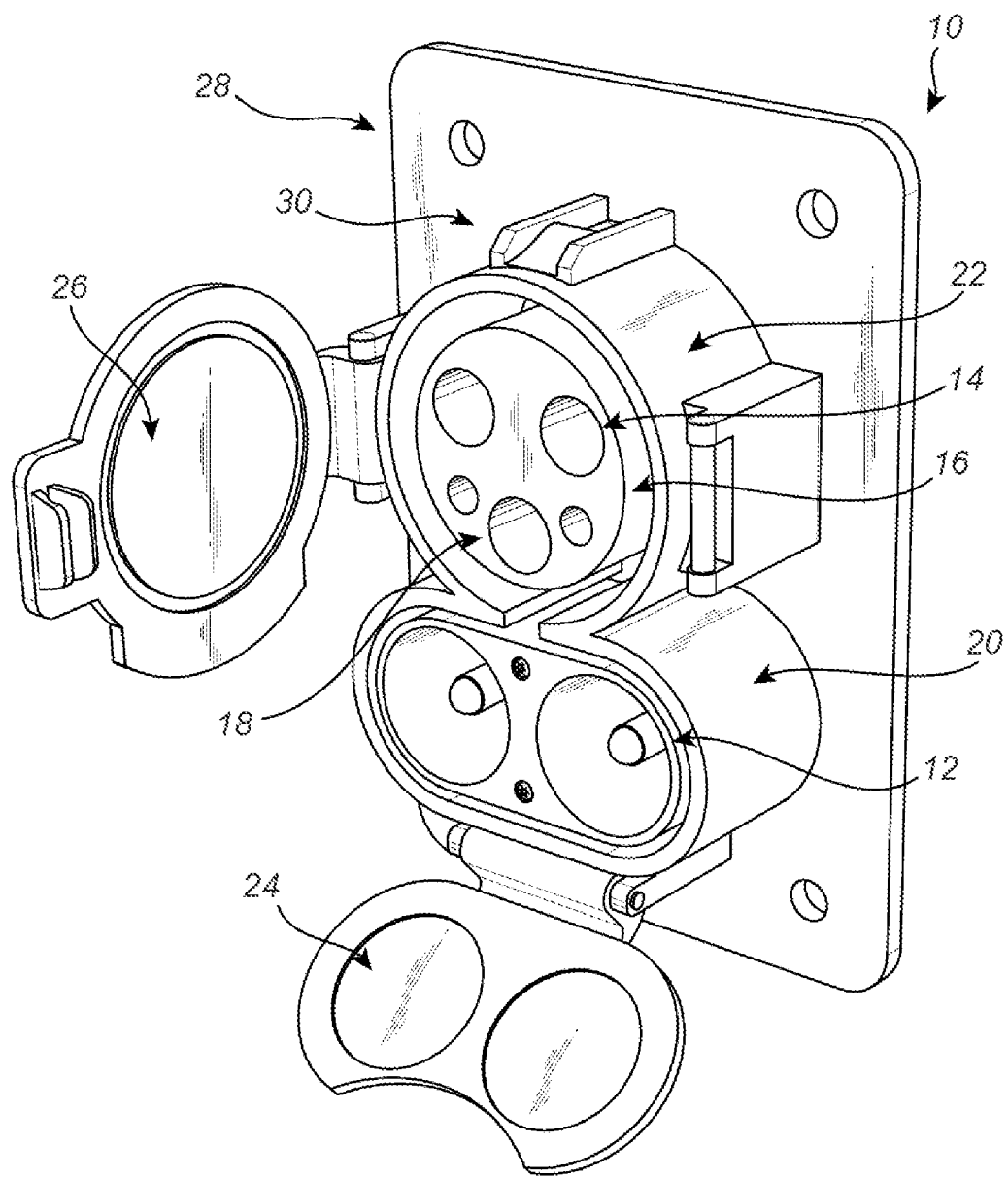
FIG. 1 is a perspective view of one charging inlet used in conjunction with the charge coupler of the present disclosure.

Referring now specifically to FIG. 1, a conventional charging inlet 10 used in conjunction with the charge coupler of the present disclosure is illustrated. Here, the charging inlet 10 is a Society of Automotive Engineers (SAE) J1772 charging inlet. The principles of the present disclosure may be applied to other types of charging inlets as well. The charging inlet 10 acts as a receptacle for the charge coupler of the present disclosure and includes a plurality of corresponding contacts, including, for example, a pair of DC contacts 12, a pair of AC level 1 or 2 or DC core contacts 14, a pair of control pilot contacts 16, and a ground contact 18, among other possible contacts. Of note, the DC contacts 12 are disposed in a second, bottom portion of the charging inlet 10, separated from the other contacts 14, 16, 18 disposed in a first, top portion of the charging inlet 10. Here, the DC contacts 12 are surrounded and/or encapsulated by a second shroud 20 that forms a second receptacle around the DC contacts 12 and the other contacts 14, 16, 18 are surrounded and/or encapsulated by a first shroud 22 that forms a first receptacle around the other contacts 14, 16, 18. These shrouds 20, 22 may intersect, but generally form two lobes of the charging inlet 10 that are adapted to receive a corresponding two lobes of the associated "plug" or charge coupler in a keyed, secure manner, thereby assuring proper mating of the various contacts 12, 14, 16, 18. Each of the shrouds 20, 22 is covered by a pivotable door 24, 24, respectively, or other cover designed to protect the various contacts 12, 14, 16, 18 from intrusion and the environment when the charge coupler is not engaged. A unitary door or other cover may also be used to enclose both shrouds 20, 22 simultaneously. The base plate 30 of the charging inlet 10 may also include one or more retainers 30 for securely but releasably receiving the charge coupler, preventing the charge coupler from inadvertently becoming disengaged from the charging inlet 10 during a charging operation. The charging inlet 10 is typically located in a side panel of an EV or the like.

Figure 2:
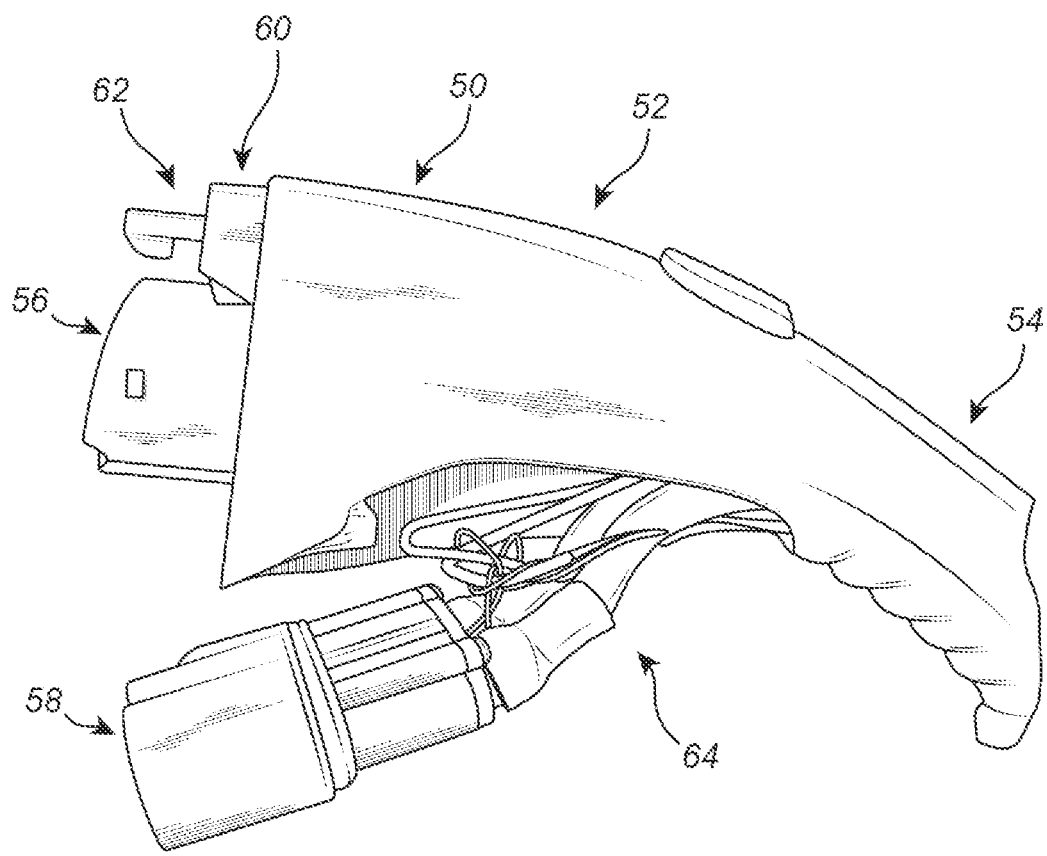
FIG. 2 is a perspective view of one charge coupler illustrating the type of damage detected by the charge coupler of the present disclosure.

As alluded to above, it is not uncommon for a vehicle operator to drop, run over, or otherwise damage CCS cables and charge couplers. One illustrative occurrence is for the DC contacts located at the bottom of the charge coupler to become detached from the remainder of the housing and contacts of the charge coupler. With the associated DC wires exposed, this poses an operability problem and a safety hazard. This type of damage is illustrated in FIG. 2. Here, the charge coupler 50 includes a housing 52 that is generally connected to a cable 54 and ultimately the associated charging station. The housing 52 generally includes a first shroud 56 again adapted to surround and/or encapsulate a pair of AC level 1 or 2 or DC contacts, a pair of control contacts, and a ground contact, among other possible contacts and a second shroud 58 adapted to surround and/or encapsulate a pair of DC contacts, as well as a keying structure 60 and latch structure 62 adapted to engage the associated charging inlet 10 (FIG. 1). As illustrated, due to an impact event, the second shroud 58 and DC contacts may become detached from the first shroud 56 and AC level 1 or 2 or DC contacts, control contacts, and ground contact.

Undesirably, this may expose the associated DC wiring 64 in the housing 52 and cable 54. Again, other types of damage may occur as well.

Figure 3:
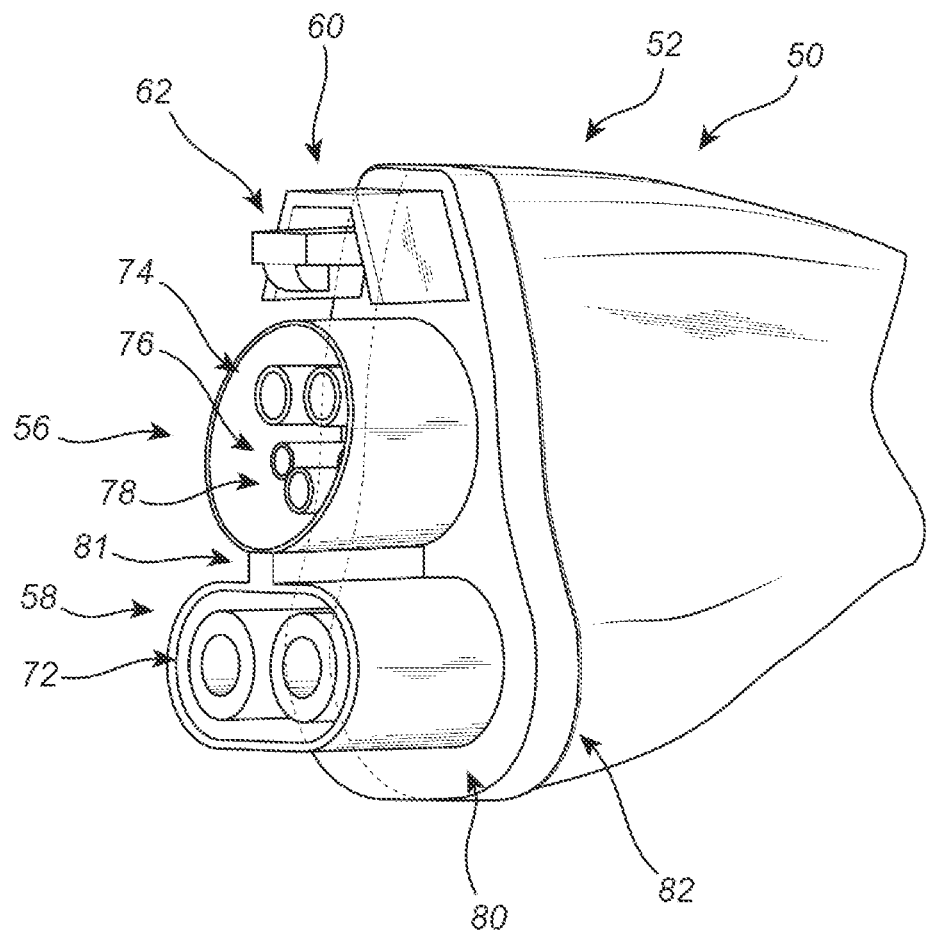
FIG. 3 is a perspective view of one illustrative embodiment of one charge coupler of the present disclosure, utilizing a safety interlock.

Referring now specifically to FIG. 3, in one illustrative embodiment, the charge coupler 50 of the present disclosure includes a housing 52 that is generally connected to a cable 54 (FIG. 2) and ultimately the associated charging station. Again, the housing 52 generally includes a first shroud 56 adapted to surround and/or encapsulate a pair of AC level 1 or 2 or DC contacts 74, a pair of control contacts 76, and a ground contact 78, among other possible contacts and a second shroud 58 adapted to surround and/or encapsulate a pair of DC contacts 72, as well as a keying structure 60 and latch structure 62 adapted to engage the associated charging inlet 10 (FIG. 1). Here, the first shroud 56 is a substantially circular structure and the second shroud 58 is a substantially oval-shaped structure, however other suitable shapes may be used. The second shroud 58 is joined to the first shroud 56 via a reinforcing connector member 81. All of these structures 56, 58, 81 protrude from the front face 80 of the housing 52.

A thin metal wire, braid, or foil conductive member 82 traverses an internal or external expanse or periphery of the housing 52, adjacent to or around the first shroud 56 and associated contacts and the second shroud 58 and associated contacts. This conductive member 82 may form a full loop or simply span the gap between the first shroud 56 and associated contacts and the second shroud 58 and associated contacts. Advantageously, if a break in the conductive member 82 is sensed, this break indicates damage to one or more of the first portion of the housing 52 associated with the first shroud 56 and the second portion of the housing 52 associated with the second shroud 58 or that the second portion of the housing 52 associated with the second shroud 58 is detached from the first portion of the housing 52 associated with the first shroud 56. In one possible refinement, the multiple conductive members 82 may be used and spaced apart with respect to various portions of the housing 52, such that a detected conductive break and housing damage can be localized based on which conductive member 82 is compromised. As described in greater detail herein below, the conductive member 82 is coupled to a control system that monitors this continued conductivity through a wire traversing the cable 54 to the charging station, for example. Such conductive members 82 may be used to ensure the continued structural integrity of various portions of the housing 52 or cable 54 of the charge coupler 50. It should be noted that the charge coupler 50 may cease current flow(s) and/or generate audio and/or visual signals responsive to detected damage to the housing 52 based on the conductive break detected in the conductive member(s) 82. For example, the charge coupler 50 may include warning lights that are illuminated or an audio speaker that is activated. Further, appropriate alerts can be communicated to and displayed on a coupled local or remote screen or vehicle screen, communicated to a remote server for logging and subsequent remedial action, etc. In another possibility, the conductive member 82 may be positioned just around the contacts 74 to detect damage to the contacts 74. Yet, in another possibility, the conductive member 82 may be positioned around the pair of control contacts 76, alone or potentially also around the ground contact 78. In yet another possibility, there may be a number or a plurality of conductive members 82, each positioned around respective contact(s) 74, 76, and/or 78, to detect damage to each one of the contacts, separately or alone. Consider another possibility, the conductive member 82 may include a first conductive loop of shroud 56 and a second conductive loop of shroud 58, where the first conductive loop 56 is disposed around the first top portion of the housing 52 encapsulating contacts 74 and 76, and the second conductive loop 58 is disposed around the second bottom portion of the housing 52 encapsulating contacts 72.

Figure 4:
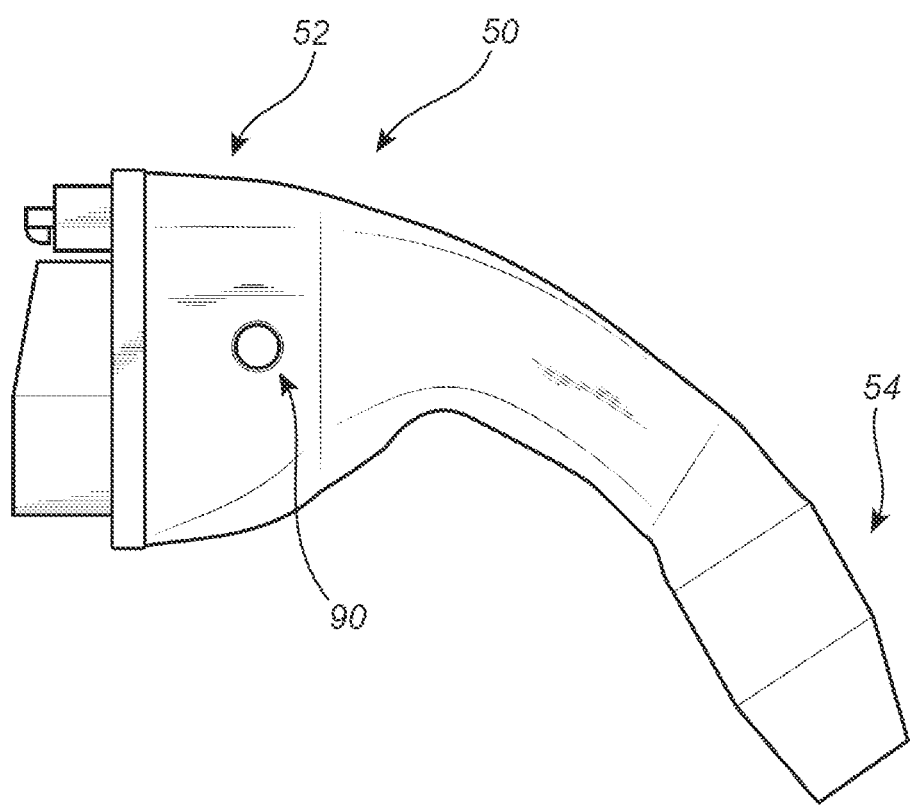
FIG. 4 is a perspective view of one illustrative embodiment of the charge coupler of the present disclosure, utilizing an accelerometer.

Referring now specifically to FIG. 4, further, an accelerometer, gyroscope, orientation sensor, and/or other sensor(s) 90 may be disposed within the housing 52 of the charge coupler 50 so that an impact exceeding a predetermined threshold to the charge coupler 50 may be sensed and detected, whether or not damage to the housing 50 results (e.g., the charge coupler 50 is dropped). As also described in greater detail herein below, the sensor 90 is coupled to the control system that monitors such impacts through a wire traversing the cable 54 to the charging station or a wireless link, for example. Again, it should be noted that the charge coupler 50 may cease current flow(s) and/or generate audio and/or visual signals responsive to sensed impact to the housing 52. For example, the charge coupler 50 may include warning lights that are illuminated or an audio speaker that is activated. Further, appropriate alerts can be communicated to and displayed on a coupled local or remote screen, such as a screen on a mobile phone or a vehicle screen, communicated to a remote server for logging and subsequent remedial action, etc. Such alerts may indicate impacts to the charge coupler 50 as described herein, the charging coupler 50 was not properly put back to its holster for storage, and/or possibly displaced, dropped, among other possible positions of the charging coupler 50. Further, an alert may be transmitted wirelessly through a base station network to a number of mobile devices of operations teams and/or driving networks for global notifications to notify repairpersons to inspect the alerts and/or other drivers regarding the alerts or detections.

Figure 5:
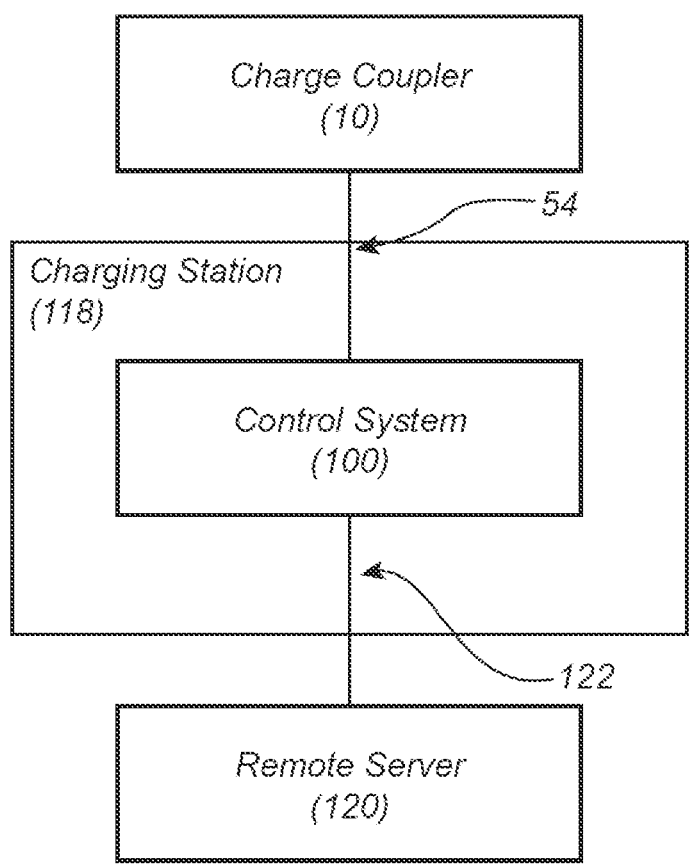
FIG. 5 is a schematic diagram of one illustrative embodiment of the charging system of the present disclosure, incorporating the charge coupler and control system provided herein.

Referring now specifically to FIG. 5, further, the conductive member 82 (FIG. 3) and sensor 90 (FIG. 4) of the charge coupler 10 are coupled to the control system 100 that monitors such impacts through a wire traversing the cable 54 to the charging station 118 or a wireless link, for example. This control system 100 may then be coupled via a wired or wireless link 122 to a remote server 120, where the overall condition of the charging infrastructure is monitored, as part of general charging station diagnostics, for example.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 6:
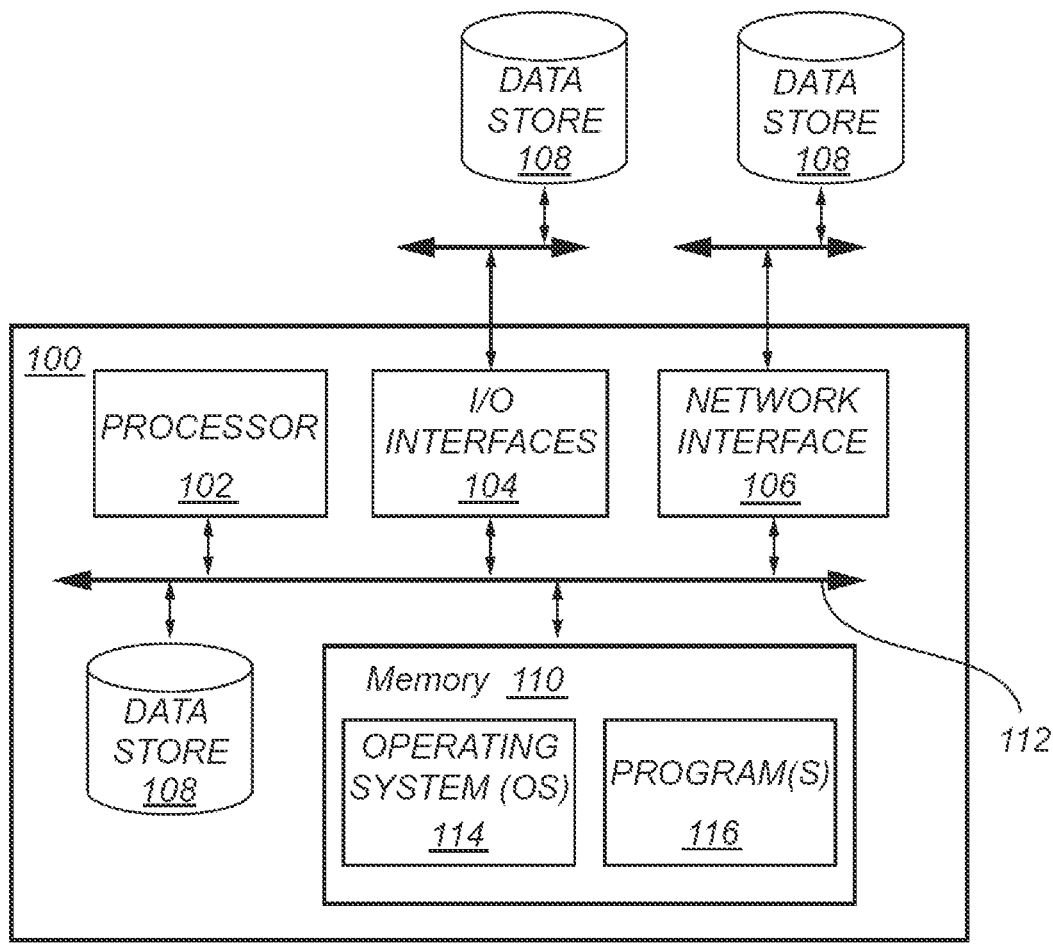
FIG. 6 is a block diagram of a control system that may be used in conjunction with the charge coupler of the present disclosure.

FIG. 6 illustrates a control system 100 that may be used to direct and monitor operation of the charge coupler of the present disclosure, including a processor 102 associated with the control system 100. The processor 102 is a hardware device for executing software instructions embodied in a non-transitory computer-readable medium. The processor 102 may be any custom made or commercially available processor, a central processing unit (CPU), an auxiliary processor among several processors associated with a server, a semiconductor-based microprocessor (in the form of a microchip or chipset), or generally any device for executing software instructions. When the control system 100 is in operation, the processor 102 is configured to execute software stored within the memory 110, to communicate data to and from the memory 110, and to generally control operations of the control system 100 pursuant to the software instructions. I/O interfaces 104 may be used to receive user input from and/or for providing system output to one or more devices or components.

A network interface 106 may be used to enable the control system 100 to communicate on a network, such as the Internet or a Local Area Network (LAN). The network interface 106 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 106 may include address, control, and/or data connections to enable appropriate communications on the network. A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. In one example, the data store 108 may be located internal to the control system 100, such as, for example, an internal hard drive connected to the local interface 112 in the control system 100. Additionally, in another embodiment, the data store 108 may be located external to the control system 100 such as, for example, an external hard drive connected to the I/O interfaces 104 (e.g., a SCSI or USB connection). In a further embodiment, the data store 108 may be connected to the control system 100 through a network, such as, for example, a network-attached file server.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 may include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 7:
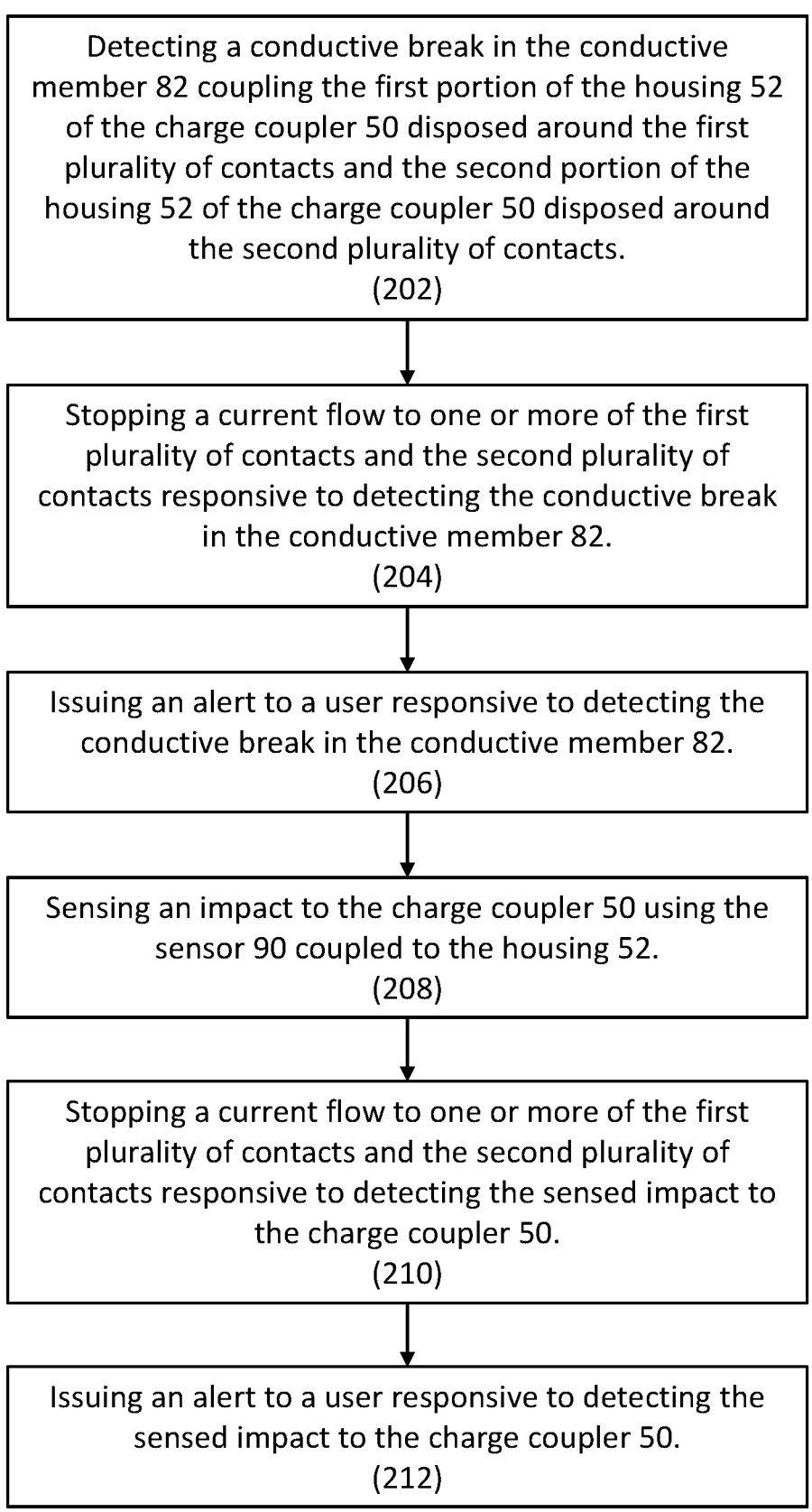
FIG. 7 is a flowchart of one illustrative embodiment of the charging method of the present disclosure, utilizing the charge coupler and control system provided herein.

Referring now specifically to FIG. 7, in one illustrative embodiment, the present disclosure provides a charging method method 200 for an electric vehicle or other electric equipment, the charging method 200 utilizing the charge coupler 50 and control system 100 described herein. The steps provided herein may be used individually or collectively, as desired, and all are not mandatory. The method 200 includes detecting a conductive break in the conductive member 82 coupling the first portion of the housing 52 of the charge coupler 50 disposed around the first plurality of contacts and the second portion of the housing 52 of the charge coupler 50 disposed around the second plurality of contacts (step 202), thereby indicating one or more of: (1) damage to one or more of the first portion of the housing 52 and the second portion of the housing 52 and (2) that the second portion of the housing 52 is detached from the first portion of the housing 52. The method 200 also includes stopping a current flow to one or more of the first plurality of contacts and the second plurality of contacts responsive to detecting the conductive break in the conductive member 82 (step 204). The method 200 further includes issuing an alert to a user responsive to detecting the conductive break in the conductive member 82 (step 206). The method 200 further includes sensing an impact to the charge coupler 50 using the sensor 90 coupled to the housing 52 (step 208). The method 200 further includes stopping a current flow to one or more of the first plurality of contacts and the second plurality of contacts responsive to detecting the sensed impact to the charge coupler 50 (step 210). The method 200 further includes issuing an alert to a user responsive to detecting the sensed impact to the charge coupler 50 (step 212).

Although the present disclosure is illustrated and described with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A charge coupler, comprising:
   a housing comprising a first portion comprising a first shroud disposed around a first plurality of contacts and an adjacent second portion comprising a second shroud disposed around a second plurality of contacts; and
   a conductive member coupled to the first portion of the housing and the second portion of the housing and spanning the housing between the first shroud and the second shroud;
   wherein the conductive member is adapted to break upon an occurrence of one or more of: (1) damage to one or more of the first portion of the housing and the second portion of the housing and (2) the second shroud being detached from the first shroud.

2. The charge coupler of claim 1, wherein the conductive member comprises a first conductive loop and a second loop, and wherein the first conductive loop is disposed around the first portion of the housing and the second conductive loop is disposed around the second portion of the housing.

3. The charge coupler of claim 1, wherein the conductive member comprises a conductive loop disposed around a periphery of the housing.

4. The charge coupler of claim 3, wherein the conductive loop is disposed around the first plurality of contacts and the second plurality of contacts.

5. The charge coupler of claim 1, further comprising a control system coupled to the conductive member and configured to detect a conductive break in the conductive member.

6. The charge coupler of claim 5, wherein the charge coupler is adapted to a charging station, and wherein the control system is coupled to the conductive member via one or more of: (1) a wire in a cable connecting the housing to the charging station and (2) a wireless link.

7. The charge coupler of claim 5, wherein the control system is configured to stop a current flow to one or more of the first plurality of contacts and the second plurality of contacts responsive to detecting the conductive break in the conductive member.

8. The charge coupler of claim 5, wherein the control system is configured to issue an alert to a user responsive to detecting the conductive break in the conductive member.

9. The charge coupler of claim 1, further comprising a sensor coupled to the housing and configured to sense an impact to the charge coupler.

10. The charge coupler of claim 9, further comprising a control system coupled to the sensor and configured to detect the sensed impact to the charge coupler.

11. The charge coupler of claim 10, wherein the charge coupler is adapted to a charging station, and wherein the control system is coupled to the sensor via one or more of: (1) a wire in a cable connecting the housing to the charging station and (2) a wireless link.

12. The charge coupler of claim 10, wherein the control system is configured to stop a current flow to one or more of the first plurality of contacts and the second plurality of contacts responsive to detecting the sensed impact to the charge coupler.

13. The charge coupler of claim 10, wherein the control system is configured to issue an alert to a user responsive to detecting the sensed impact to the charge coupler.

14. A method, comprising:
    providing a conductive member coupled to and between a first portion of a housing of a charge coupler comprising a first shroud disposed around a first plurality of contacts and an adjacent second portion of the housing of the charge coupler comprising a second shroud disposed around a second plurality of contacts;
    wherein the conductive member is adapted to break upon an occurrence of one or more of: (1) damage to one or more of the first portion of the housing and the second portion of the housing and (2) the second shroud being detached from the first shroud; and
    detecting a conductive break in the conductive member.

15. The method of claim 14, further comprising stopping a current flow to one or more of the first plurality of contacts and the second plurality of contacts responsive to detecting the conductive break in the conductive member.

16. The method of claim 14, further comprising issuing an alert to a user responsive to detecting the conductive break in the conductive member.

17. The method of claim 14, further comprising sensing an impact to the charge coupler using a sensor coupled to the housing.

18. The method of claim 14, further comprising stopping a current flow to one or more of the first plurality of contacts and the second plurality of contacts responsive to detecting the sensed impact to the charge coupler.

19. The method of claim 14, further comprising issuing an alert to a user responsive to detecting the sensed impact to the charge coupler.

20. A charging system for an electric vehicle, the charging system comprising:
    a charge coupler, comprising:
        a housing comprising a first portion comprising a first shroud disposed around a first plurality of contacts and an adjacent second portion comprising a second shroud disposed around a second plurality of contacts; and
        a conductive member coupled to the first portion of the housing and the second portion of the housing and spanning the housing between the first shroud and the second shroud;
        wherein the conductive member is adapted to break upon an occurrence of one or more of: (1) damage to one or more of the first portion of the housing and the second portion of the housing and (2) the second shroud being detached from the first shroud; and
    a control system coupled to the conductive member and configured to detect a conductive break in the conductive member.

* * * * *